US008788583B2

(12) United States Patent
Chan et al.

(10) Patent No.: US 8,788,583 B2
(45) Date of Patent: Jul. 22, 2014

(54) SHARING FORM TRAINING RESULT UTILIZING A SOCIAL NETWORK

(75) Inventors: Yuk L. Chan, Poughkeepsie, NY (US); Tin Hang To, Poughkeepsie, NY (US); Wei Zhou, Poughkeepsie, NY (US); Uman Chan, Staten Island, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 12/779,445

(22) Filed: May 13, 2010

(65) Prior Publication Data

US 2011/0282941 A1 Nov. 17, 2011

(51) Int. Cl.
G06F 15/16 (2006.01)
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl.
USPC .......................................... 709/204; 715/226

(58) Field of Classification Search
USPC .......................................... 709/204; 715/226
See application file for complete search history.

(56) References Cited

U.S. PATENT DOCUMENTS

| 5,870,559 | A | * | 2/1999 | Leshem et al. ................. 709/224 |
| 5,958,008 | A | * | 9/1999 | Pogrebisky et al. ............ 709/223 |
| 6,084,585 | A |   | 7/2000 | Kraft et al. |
| 6,662,340 | B2 | * | 12/2003 | Rawat et al. ................... 715/236 |
| 6,718,365 | B1 |   | 4/2004 | Dutta |
| 7,305,129 | B2 |   | 12/2007 | Chellapilla et al. |
| 7,603,350 | B1 |   | 10/2009 | Guha |
| 7,818,394 | B1 |   | 10/2010 | Lawler et al. |
| 2002/0107755 | A1 | * | 8/2002 | Steed et al. ..................... 705/26 |
| 2002/0120864 | A1 | * | 8/2002 | Wu et al. ........................ 713/201 |
| 2003/0078949 | A1 | * | 4/2003 | Scholz et al. .................. 707/505 |
| 2004/0030991 | A1 | * | 2/2004 | Hepworth et al. ............. 715/507 |
| 2004/0100510 | A1 |   | 5/2004 | Milic-Frayling et al. |
| 2004/0107363 | A1 |   | 6/2004 | Monteverde |
| 2005/0183003 | A1 | * | 8/2005 | Peri ................................ 715/507 |
| 2005/0256866 | A1 |   | 11/2005 | Lu et al. |
| 2006/0015722 | A1 |   | 1/2006 | Rowan et al. |
| 2007/0074125 | A1 |   | 3/2007 | Platt et al. |
| 2007/0233808 | A1 |   | 10/2007 | Egnor et al. |
| 2008/0172598 | A1 | * | 7/2008 | Jacobsen et al. .............. 715/224 |

(Continued)

*Primary Examiner* — Brian P Whipple
(74) *Attorney, Agent, or Firm* — Cantor Colburn LLP; William A Kinnaman, Jr.

(57) ABSTRACT

A mechanism is provided for sharing form data by users of a social network. A first value input for a first label by a first user is received. The first label is associated with a tag in a mapping table. The first value is associated with the tag in a first user table. The first value is recognized as input for a different label than the first label. The different label is associated with the tag in mapping table. A second value is received that is input for a second label by a second user. The second label is associated with the tag in the mapping table. The second value is associated with the tag in a second user table. The second value is recognized as input for a different label than the second label. The different label than the second label is associated with the tag in mapping table.

16 Claims, 8 Drawing Sheets

(56) References Cited

U.S. PATENT DOCUMENTS

2009/0030969 A1 1/2009 Dutta et al.
2010/0030779 A1 2/2010 Tan
2010/0049770 A1 2/2010 Ismalon

* cited by examiner

SHARING FORM TRAINING RESULT UTILIZING A SOCIAL NETWORK

BACKGROUND

Exemplary embodiments relate to automatic fill-in of forms, and more specifically, to form training data (result) that can be utilized to automatically fill in forms.

In one conventional example, a client side program code examines electronic documents such as web pages and automatically fills out fields of forms contained in the document with the appropriate data from a user profile, without requiring prior mapping or examination of the form. The application maps user data to the appropriate form field by examining label text on the form as the user sees it, i.e., text that is visually nearest the field. For fields lacking labels, the application examines the field context to determine the required data. To enter the information in the correct format, the application parses visual hints concerning, for example, the date format provided to the user and formats the data accordingly. In the absence of any usable visual cues or contextual information, the program code parses the form's underlying markup code.

BRIEF SUMMARY

According to one exemplary embodiment, a method implemented on a computer is provided for sharing form data by users of a social network. The computer receives a first value that is input for a first label by a first user and associates the first label with a tag in a mapping table. The computer associates the first value with the tag in a first user table (also referred to herein as a user profile) and recognizes the first value is input for a different label than the first label by the first user. In response to recognizing that the first value is input for the different label than the first label, the computer associates the different label with the tag in the mapping table. The computer receives a second value that is input for a second label by a second user. The computer associates the second label with the tag in the mapping table and associates the second value with the tag in a second user table. The computer recognizes the second value is input for a different label than the second label by the second user. In response to recognizing that the second value is input for the different label than the second label, the computer associates the different label than the second label with the tag in the mapping table.

According to one exemplary embodiment, a system is provided for sharing form data by users of a social network. The system includes an application on a computer and a mapping table. For each member of a social network, the application is configured to execute a following process. When a user inputs a value, the value is associated with a tag in a user profile. In response to searching the user profile for the value and finding the tag associated with the value, each time the value is subsequently recognized as being input by the user, a corresponding label in a document in which the value is input is mapped to the tag in the mapping table.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Existing automatic form filling solutions attempt to determine the meaning of the fields within a form by, for example, a dictionary lookup that maps contextual information (e.g., field labels) to predefined tags. New assignments have to be updated to the dictionary. Also, in existing automatic filling solutions, manual training assigns a predefined tag to each field of a form, and new assignments are updated to the system. However, the new assignments are visible and usable to only the user/organization who created them. Also, the frequency of such new assignments might not happen fast enough to keep pace with the fast changes of, e.g., Internet forms.

In addition, in a globalized e-commence environment, it is not uncommon to have forms in different languages with similar contextual information, and the fore-mentioned issue requires personnel with multi-lingual skills and requires additional investment for each language.

Exemplary embodiments provide a mechanism that involves sharing the form training result (data) across a social network (such as the Internet), where users in the network will train the training forms and the training result will be made available to the other users within the social network. The population and activities of the social network ensure the training forms are up-to-date (in a short time period). In addition, a training form can be in different languages and have equivalent fields, and exemplary embodiments can input the same value into the equivalent fields. The wide audience of the social network based training allows the forms in different languages to map to a single tag.

Figure 1:
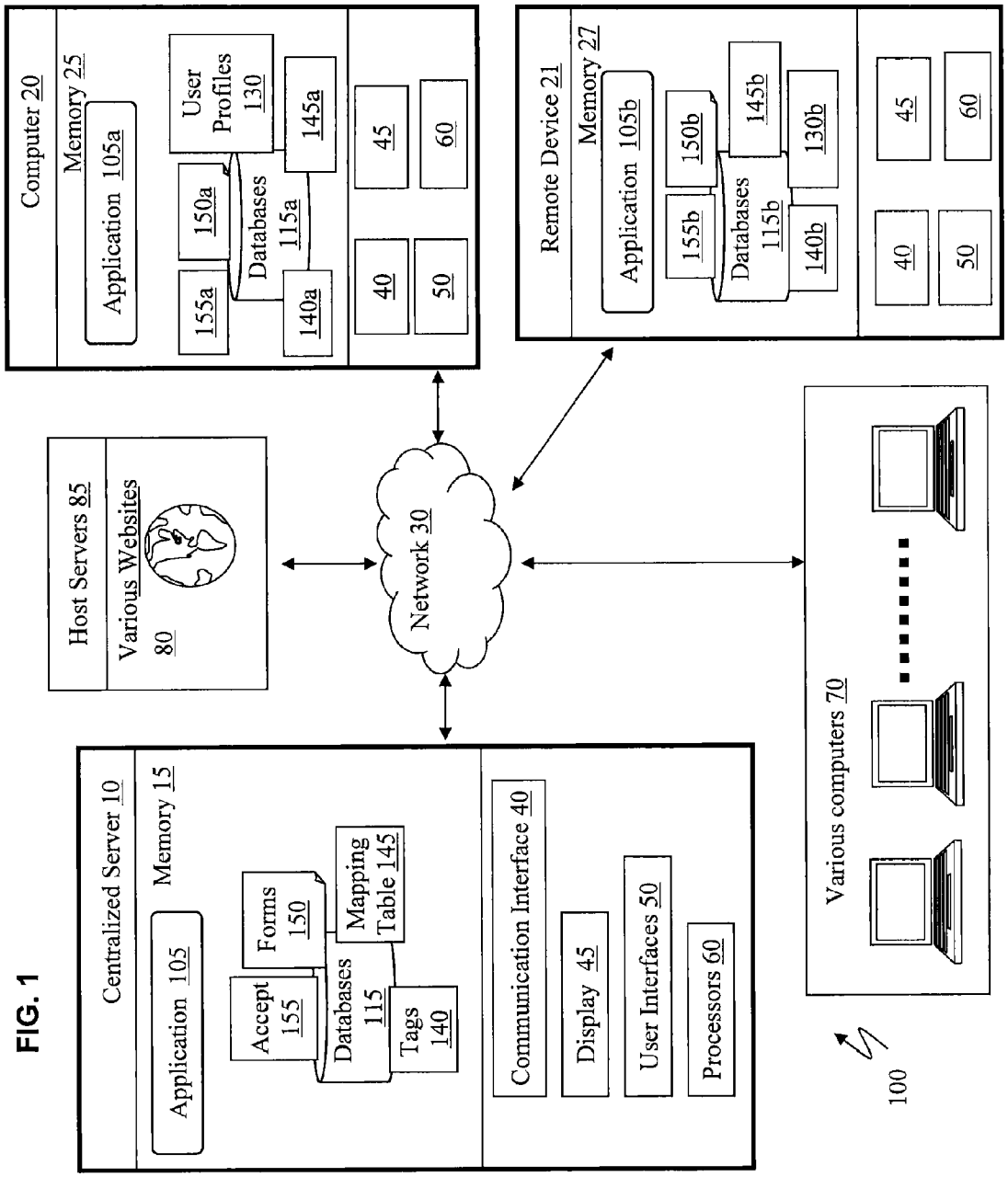
FIG. 1 illustrates a block diagram in accordance with exemplary embodiments.

Now turning to FIG. 1, FIG. 1 illustrates a block diagram 100 in accordance with exemplary embodiments.

The diagram 100 includes a centralized server 10, host servers 85 which represent various computing devices that host websites, computer 20, and various computers 70 operatively connected to a network 30. The centralized server 10, host servers 85 (details not illustrated for clarity), computer 20, and various computers 70 (details not illustrated for clarity) may each include and/or be coupled to a communication interface 40, display 45, user interfaces 50, processors 60, memory, and software.

The communication interface 40 comprises hardware and software for communicating over the network 30. The user interfaces 50 may include, e.g., a track ball, mouse, pointing device, keyboard, etc.

The centralized server 10 includes memory 15 which may be a computer readable storage medium. One or more applications 105 may reside on or be coupled to the memory 15, and the application 105 comprises logic and software components to operate and function in accordance with exemplary embodiments in the form of computer executable instructions. One or more databases 115 include user profiles 130.

The computer 20 includes memory 25, which may be a computer readable storage medium, and an application 105a may reside on or be coupled to the memory 25. The application 105a comprises logic and software components to operate and function in accordance with exemplary embodiments in the form of computer executable instructions. The computer 20 includes one or more databases 115a similar to the database 115. The database 115a includes a user profile 130 not shown in the database 115 because the user profile 130 contains personal information of the user. Although not shown, it is contemplated that the database 115 of the centralized server 10 may include the user profile 130 if so desired by the user.

A remote device 21 includes memory 27, which may be a computer readable storage medium, and an application 105b may reside on or be coupled to the memory 27. The application 105b comprises logic and software components to operate and function in accordance with exemplary embodiments in the form of computer executable instructions. The remote device 21 includes one or more databases 115b similar to the database 115 on the centralized server 10.

The centralized servers 10 are configured to maintain a predefined set of tags as predefined tags 140, such as First Name, Last Name, Street Address, etc., in the database 115. Also, the database 115 may include training forms 150, and the data fields of the training form 150 are associated with the predefined tags 140. For example, a label in a data field of the training form 150 is mapped to a predefined tag 140, and a value input for the label is mapped to the predefined tag 140 as discussed further in the disclosure.

In the present disclosure, the term "application 105" is utilized to refer to the applications 105, 105a, and 105b, and when a distinction is meant between the applications 105, 105a, and 105b, the application 105a or 105b will be indentified individually to show that applications 105a and 105b can be utilized on a specific person's local computer without having to connect to the centralized server 10. Anytime the term "application 105" is utilized, it is understood that the functionality can apply specifically to the application 105 on the centralized server 10. The term "predefined tags 140" is utilized to refer to the predefined tags 140, predefined tags 140a, and predefined tags 140b, and when a distinction is meant between the predefined tags 140, 140a, and 140b, the predefined tags 140a or 140b will be indentified individually to show that the predefined tags 140a and 140b can be utilized on a specific person's local computer without having to connect to the centralized server 10. Anytime the term "predefined tags 140" is utilized, it is understood that the functionality can specifically apply to the predefined tags 140 on the centralized server 10. The term "mapping table 145" is utilized to refer to the mapping table 145, mapping table 145a, and mapping table 145b, and when a distinction is meant between the mapping table 145, 145a, and 145b, the mapping table 145a or 145b will be indentified individually to show that the mapping table 145a and 145b can be utilized on a specific person's local computer without having to connect to the centralized server 10. Anytime the term "mapping table 145" is utilized, it is understood that the functionality can specifically apply to the mapping table 145 on the centralized server 10. The term "training form 150" is utilized to refer to the training form 150, training form 150a, and training form 150b, and when a distinction is meant between the training form 150, 150a, and 150b, the training form 150a or 150b will be indentified individually to show that the training form 150 can be utilized on a specific person's local computer without having to connect to the centralized server 10. Anytime the term "training form 150" is utilized, it is understood that the functionality can specifically apply to the training form 150 on the centralized server 10.

The application 105a on the user computer 20 is operative to be responsible for form training of the training form 150 and for initializing the user profile 130. Also, the application 105 on the centralized server 10 and/or the application 105b is operative to be responsible for form training of the training forms 150. For illustration purposes, the various computers 70 may be identical to the computer 20 but represent many different users. Also, the computer 20 may be representative of numerous different users but is shown as the single computer 20.

The application 105 of the centralized server 10 is configured to receive data from many different training forms 150 and other forms (which are not the training forms 150 but are electronic forms) that require data input, and the data is input by different users of the computers 20 and 70 utilizing, e.g., the user interface 50.

In accordance with exemplary embodiments, the application 105 is configured to provide the training forms 150 to the users of the computers 20 and 70 via, e.g., a website hosted by the centralized server 10. The user of computers 20 and 70 input their data (values) into fields of the training forms 150 and training data is stored in the database 115 by the application 105. For each field, the training forms 150 have a label, such as "last name", and the user (of computers 20 and 70) can input the value such as "Smith" for her last name. The application 105 analyzes data input for each field of the training form 150, and stores the data in the database 115. For the training form 150, the application 105 may previously assign a predefined tag 140 to the label and to the corresponding empty value before the user inputs data into the empty value. The value is an empty value because the user (of computers 20 and 70) has not input the value "Smith" for her last name in the form 150. Additionally and/or alternatively, the application 105 may assign the predefined tag 140 to the label and the corresponding value after the user (of computers 20 and 70) inputs "Smith" as the value for her last name in the form 150.

For the training form 150 (and any form), the application 105 is configured to assign the predefined tag 140 to the label "last name" in a mapping table 145. In the mapping table 145, the same predefined tag 140 may be assigned to multiple different labels based on the training data (training result) from many different users (of computers 20 and 70) who input data (values) into the forms 150 (and other forms). In addition to assigning the predefined tag 140 to the multiple different labels in the mapping table 145, the application 105 is configured to assign the same predefined tag 140 to the value "Smith" in the user profile 130 for that particular user. In exemplary embodiments, each user has his own user profile 130 that has values (such as "Smith") assigned to predetermined tags 140. Each individual user profile of the users is stored in the user profiles 130 in the database 115. By parsing the user profile 130, the mapping table 145, and the training form 150 (and other forms), the application 105 is configured to analyze whether, e.g., a user has input the same value such as "Smith" into data fields corresponding to different labels such as "last name", "family name", and/or "surname". Accordingly, the application 105 is configured to assign the same predefined tag 140 to each label "last name", "family name", and "surname" in the mapping table 145, and the mapping table 145 illustrates that the same predefined tag 140 can be assigned to different labels in FIG. 2 based on the application 105 recognizing that users respectively input the same value (such as "Smith" for one user) for different labels meaning input your last name. Also, the same predefined tag 140 is assigned to the value "Smith" in the user profile 130 for that particular user. Each user has her own user profile which is represented as user profile 130 on computers 20 (and understood to be on computer 70 but not shown for clarity). Additionally and/or alternatively, although not shown, any user could also have her user profile 130 securely stored on the centralized server 10 along with the computers 20 and 70, and/or in place of the computers 20 and 70.

If the user is filling out a different form (that is not one of the training forms 150 of the centralized server 10) on a website 80 hosted by the host server 85, the application 105 (105a) (stored on the user's computer 20 and/or accessed on the centralized server 10) is configured to analyze the fields of the different form, the labels, the values input by the user, and the underlying code of the different form. The application 105a may be utilized when, e.g., access to the application 105 is unavailable such as during a network 30 failure and/or when there is no Internet access. Although the term "application 105" can generally refer to application 105 of the centralize server 10, application 105a of the computer 20, and application 105b of the remote device 21, application 105a is indentified below at times to make clear that the process can be (completely) done locally. Although not shown, the computer 20 may download a local copy of the mapping table 145 for storage in the database 120. Now returning to the example, the application 105 (105a) is configured to scan the code of the different form and to scan the displayed terms (e.g., labels) of the different form as the user inputs values (data). If the application 105 (105a) determines that the user has input a value previously stored in, e.g., the user profile 130 (for the particular user), the application (105) 105a identifies the corresponding predefined tag 140 in the user profile 130. By scanning (parsing) the different form, the application 105 (105a) locates the label that corresponds to the value input by the user, and the application 105 (105a) assigns that corresponding label to the same predefined tag 140 (that was identified in the user profile 130) in the mapping table 145 (e.g., the local copy of the mapping table in database 120 of the computer 120). For example, if the different form had the label "cognomen" and the user input the value "Smith", the application 105 (105a) would recognize the value "Smith" (by searching for the value "Smith" in the user profile 130) and locate its related predefined tag 140 in the user profile 130. After mapping "cognomen" to the predefined tag 140 in the local mapping table, the application 105a would communicate (synchronize) with the application 105 to add "cognomen" as one of the (new) labels for the particular predefined tag 140 in the mapping table 145. Additionally, if the application 105 maps "cognomen" to the predefined tag 140, there would be no need to synchronize the local copy of the mapping table stored in database 120 to the mapping table 145 stored in the database 115. Therefore, in the mapping table 145, the same predefined tag 140 would now be assigned to the following labels "cognomen", "last name", "surname", and "family name", e.g., as assigned to tag 3 the mapping table 145 illustrated in FIG. 2. As the different users (of the computers 20 and 70) continue to utilize the various training forms 150 and various different forms (which can be any form requiring data to be input), the application 105 continues to make associations that will increase the amount of labels assigned to each predefined tag 140. Consequently, by constantly increasing the labels associated with predefined tags 140 in the mapping table 145, the ability of the application 105 to recognize new labels when automatically inserting values (from respective user profiles 130) to fill in forms for users is increased.

Moreover, via the application 105, the mapping table 145 is configured to benefit from the numerous users who continuously update the labels (to predefined tag 140 relationships) of the mapping table 145, such that a single predefined tag 140 may have numerous associated labels in the mapping table 145 in accordance with exemplary embodiments. The mapping table 145 may be considered as a master mapping table 145, and the users of the social network update (or it is possible to update) the mapping table 145 each time they input values in the training forms 150 and in the different forms (which are not the training forms 150). Also, in exemplary embodiments, the application 105 may be configured to determine that a certain percentage of users have input the correct value for a corresponding new label before the application 105 assigns the corresponding new label to the predefined tag 140 in the mapping table 145. So, for example, although one user may input "Smith" as the value for the label "cognomen", the application 105 may not immediately associate "cognomen" with the predefined tag 140 (in the mapping table 145) because the application 105 may wait until a threshold of other users (in the social network) have input their respective last name as the value for the label "cognomen". Also, the label "cognomen" may be automatically added by the application 105 to one of the training forms 150, and when the application 105 determines that the other users (a predetermined percentage) have input the value for their corresponding last name to the label "cognomen", the application 105 then (officially) assigns "cognomen" as a label to the predefined tag 140.

As discussed herein, the users of the different computers 20 and 70 who input (values) data that can be utilized to expand the mapping table 145 may, e.g., be part of a social network. The population and activities of the social network ensure the training forms 150 are up-to-date (in a short time period). In addition, a training form 150 can be in different languages and have equivalent fields (as another language), and the application 105 can input the same value (during automatic fill-in of form) into the equivalent fields. By utilizing the application 105, the wide audience of the social network based training allows the (labels of) forms in different languages to map to a single predefined tag 140. Because users have input the same value for equivalent labels of different languages, the application 105 is configured to add the equivalent labels of the different languages to the same predefined tag 140. Accordingly, when the application 105 parses a form and recognizes a (foreign) label for last name (in any language), the application 105 is configured to locate the predefined tag 140 corresponding to that foreign label in the mapping table 145, which allows the application 105 to locate the corresponding value in the user profile 130 for the last name, e.g., "Smith" regardless of the language of the label; the application 105 can then automatically input the value "Smith" in the field having the foreign label that corresponds to last name.

Figure 3:
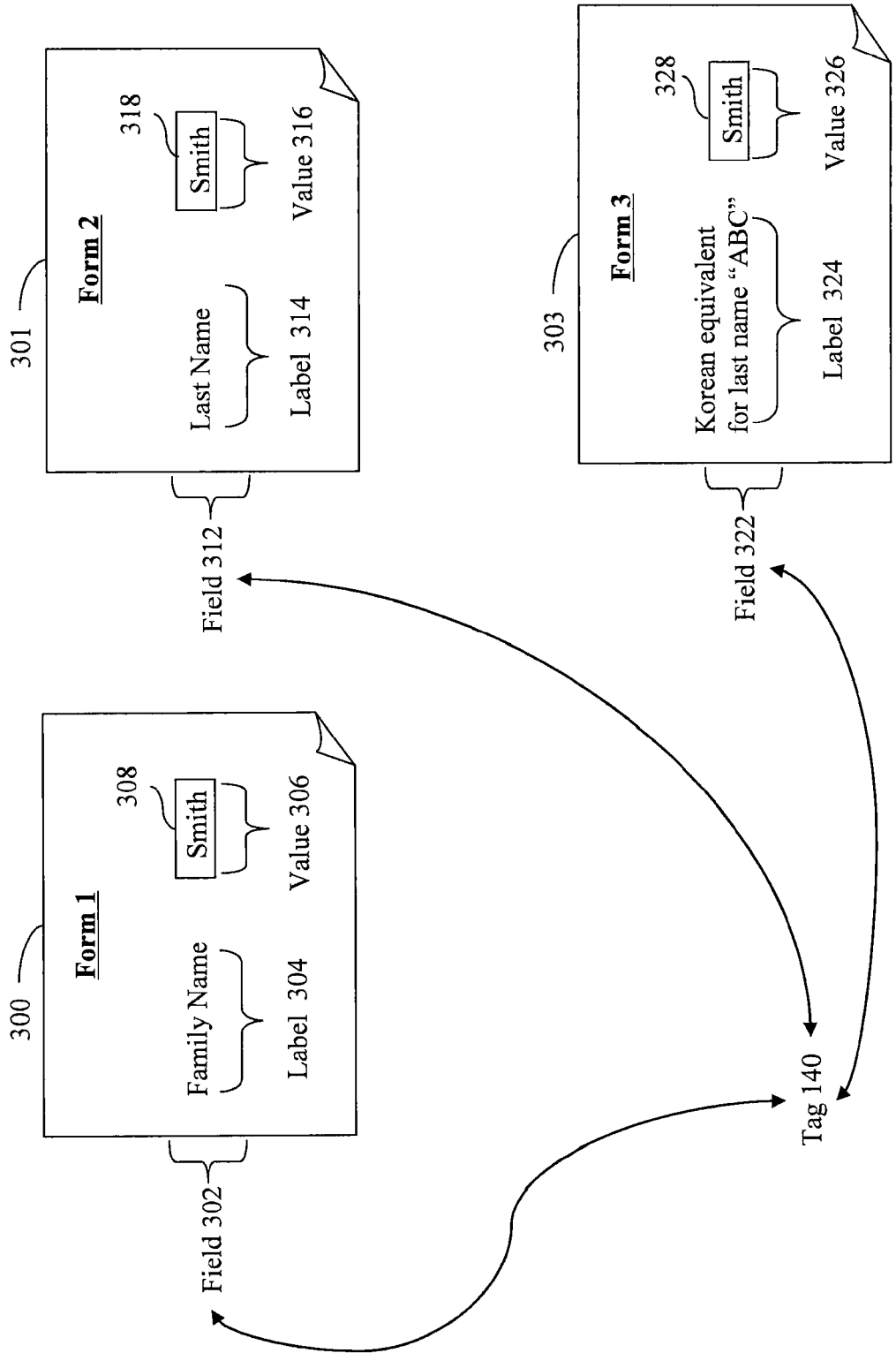
FIG. 3 illustrates an example of forms in accordance with exemplary embodiments.

Now turning to FIG. 3, FIG. 3 illustrates an example of forms in accordance with exemplary embodiments. Although forms 300, 301, and 303 are illustrated with a single data field 302, 312, and 322 for explanation purposes, it is understood that the forms 300, 301, and 303 include numerous data fields.

There are many different scenarios of exemplary embodiments that can be illustrated with FIG. 3. In one scenario, the forms 300, 301, and 303 are training forms 150 in accordance with exemplary embodiments, in another scenario the forms 300, 301, and 303 may be forms other than the training forms 150, and in a third scenario the forms 300, 301, and 303 may be a combination of both training forms 150 and other forms (that are not training forms 150). In other words, exemplary embodiments can apply and function for any type of electronic form, and the present disclosure is not meant to be limited to a particular type of form.

Form 300 represents an example form 1, which may be both a training form 1 and/or any form 1 that is not the training form 150. Likewise, the forms 301 and 303 are examples of forms 2 and 3 respectively which may be both training forms 1 and 2 and/or any forms 1 and 2 which are not training forms 150.

Figure 2:
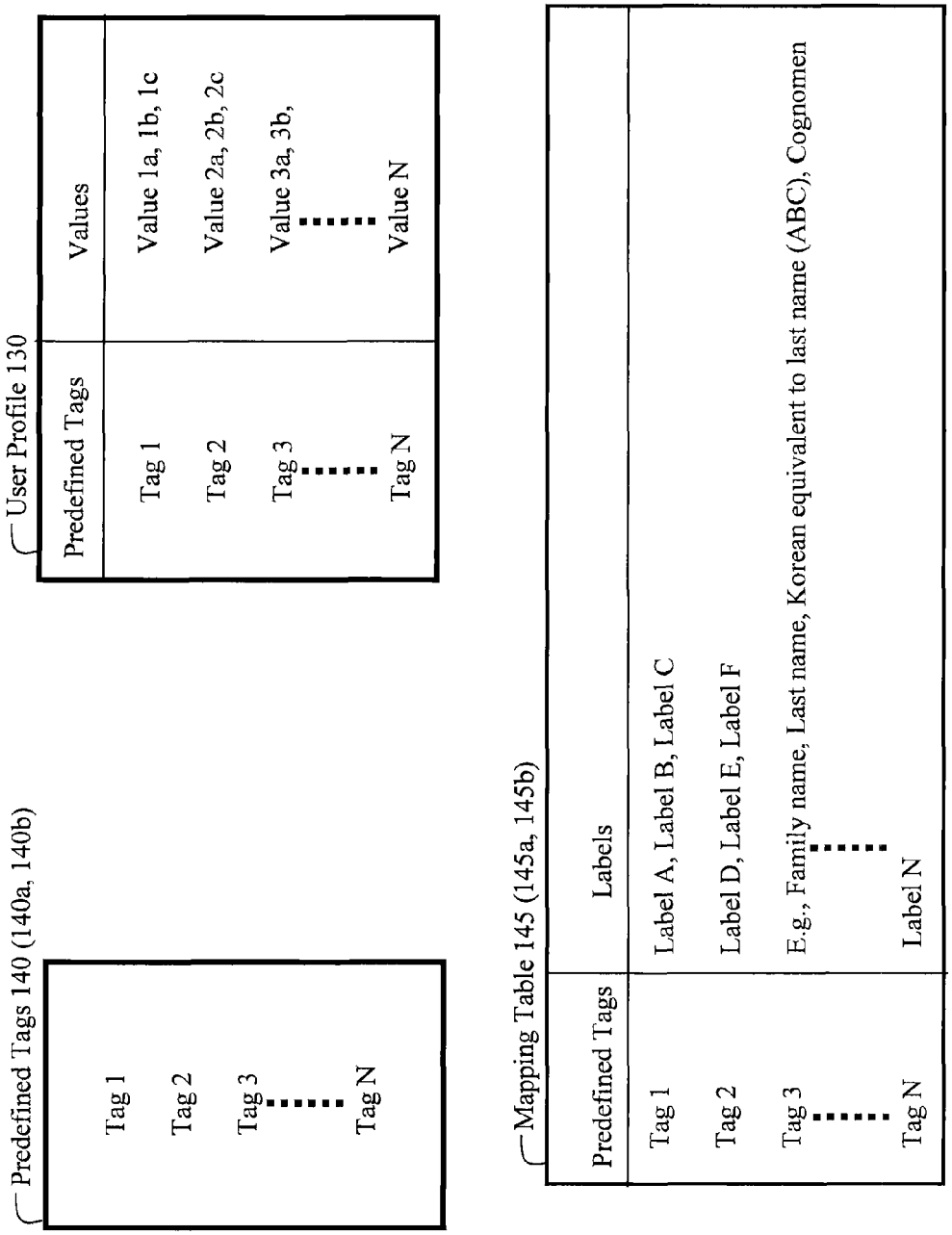
FIG. 2 illustrates an example of predefined tags, a user profile, and a mapping table in accordance with exemplary embodiments.

Form 1 includes field 302 (among other fields not shown). Field 302 has a label 304 which is "Family Name". If the user of the computer 20 is inputting data for the form 1, the label 304 of Family Name is displayed to the user on the display 45. When the user sees the label 304 displaying Family Name on the display 45, the user of the computer 20 can input the value 306 which is "Smith" in the box 308 via the user interface 50 (e.g., keyboard). When no value 306 (such as "Smith") is input in the box 308, the box 308 (and boxes 318 and 328) may be considered an empty value as discussed herein. The field 302 and its contents are associated with a particular predefined tag 140 of the predefined tags 140. Utilizing the application 105, the field 302 and its contents may be pre-assigned to the predefined tags 140 for training forms 150 and may be assigned while the form 1 (or forms 2 and 3) is being analyzed for forms other than the training forms 150. In either case, the application 105 associates the tag 140 with the value 306 (which is "Smith") in the user profile 130 and the tag 140 with the label 304 (which is Family Name) in the mapping table 145. Referring to FIG. 2, the mapping (association by the application 105) of the tag 140 to the label 304 is illustrated with reference to tag 3 of the predefined tags 140 in the mapping 145.

Form 2 includes field 312 (among other fields not shown). Field 312 has a label 314 which is "Last Name". If the user of the computer 20 is inputting data for the form 2, the label 314 of Last Name is displayed to the user on the display 45. When the user sees the label 314 displaying Last Name on the display 45, the user of the computer 20 can input the value 316 which is also "Smith" in the box 318 via the user interface 50 (e.g., keyboard). The field 312 and its contents are associated with a particular predefined tag 140 of the predefined tags 140. The application 105 associates the tag 140 with the value 316 (which is "Smith") in the user profile 130 and associates the tag 140 with the label 314 (which is Last Name) in the mapping table 145. Again referring to FIG. 2, the mapping (association by the application 105) of the tag 140 to the label 314 is illustrated with reference to tag 3 of the predefined tags 140 in the mapping 145. Just as in form 1, the same user has again input the value "Smith", and the application 105 is configured to recognize (by searching for a match to the value in the user profile 130) the input value 316 as being the same as the input value 306 for this user.

Form 3 includes field 322 (among other fields not shown). Field 322 has a label 324 which is the Korean equivalent for last name which is referred to as "ABC" for explanation purposes. (Korean is used here as an arbitrary example of a foreign language with which the disclosed embodiments can be used; any other foreign language would serve just as well.) If the user of the computer 20 is inputting data in the form 3, the label 324 of ABC is displayed to the user on the display 45. When the user sees the label 324 displaying ABC (which is the Korean equivalent for last name) on the display 45, the user of the computer 20 can input the value 326 which is also "Smith" in the box 328 via the user interface 50 (e.g., keyboard). The field 322 and its contents are associated with the particular predefined tag 140 of the predefined tags 140; this association may have been pre-assigned for training forms 150 and/or presently assigned for other forms (different from the training forms 150). The application 105 associates the tag 140 with the value 326 (which is "Smith") in the user profile 130 and associates the tag 140 with the label 324 (which is ABC) in the mapping table 145. Again referring to FIG. 2, the mapping (association by the application 105) of the tag 140 with the label 324 is illustrated with reference to tag 3 of the predefined tags 140 in the mapping 145. Just as in forms 1 and 2, the same user has again input the value "Smith", and the application 105 is configured to recognize (by searching for a match to the value "Smith" in the user profile 130) the input value 326 as being the same as the input values 306 and 316 for this user.

The above process occurs for every user of the social network in accordance with exemplary embodiments, and the culmination of different labels from different forms (both training forms 150 and other forms) is utilized by the application 105 to expand the mapping table 145.

The example forms 1, 2, and 3 (and other forms) may be filled out at different times by different users of the social network. The application 105 is configured to recognize that each user input the same respective value for different labels, and accordingly the application 105 maps the label to the same predefined tag 140 (after determining the predefined tag 140 from the user profile 130). For example, for labels 304, 314, and 324, a user 1 may input the value X. For labels 304, 314, and 324, a user 2 may input the value Y. For labels 304, 314, and 324, a user 3 may input the value Y. Since the data input by users 1, 2, and 3 is shared by the application 105 and since the respective user profiles 130 for users 1, 2, and 3 are shared by the application 105, the application 105 is configured to search for and recognize this pattern. In other words, the application 105 is configured (with logic) to make the correlation that each user 1, 2, and 3 has input the same respective value to correspond to the labels 304, 314, and 324 (regardless of whether the data is input in the training form 150 and/or in a form different from the training form 150). As such, the application 105 assigns each of the labels 304, 314, and 324 to the same predefined tag 140 (that corresponds to the respective values in their respective users profiles 130) based on the value input by the users 1, 2, and 3. The predefined tag 140 may be an alphanumeric term such as 123ABC, and this term (for this particular predefined tag 140) is the same in each user profile 130 for users 1, 2, and 3, although the value (X, Y, and Z) that corresponds to this term is different for each user in their respective user profiles 130.

Now referring to FIG. 2, FIG. 2 illustrates an example of the predefined tags 140, user profile 130, and mapping table 145 in accordance with exemplary embodiments. It is understood that these examples are not meant to be limiting and are only for explanation purposes. The predefined tags 140 in the database 115 may include tag 1 through tag N, which illustrates that the predefined tags 140 include numerous predefined tags 140. Each predefined tag may be an alphanumeric number such as ABC123, and/or the tags may be a term representative of their associated value such as the tag may be last name to correspond to the value of a last name. The predefined tags 140 may be assigned by the application 105, i.e., mapped to labels and values as discussed herein.

In FIG. 2, the user profile 130 illustrates a user profile table that has a tag assigned to a specific value that has been input in the training forms 150 and/or other forms, such as the forms 300, 301, and 303. Each tag has a one-to-one relationship with its corresponding value. For example, tag 1 corresponds to value 1a, value 1b, and value 1c, tag 2 corresponds to value 2a, value 2b, value 2c, and so forth. Each user can only access his user profile 130, and the application 105 can access each user profile 130, e.g., to determine when additional labels should be assigned to the predefined tags 140 in the mapping table 145. For each user, a copy of the user profile 130 is stored locally (with an option to store the user profile 130 on the centralized server) so that the application 105a can continue to update (and automatically fill in forms) the mapping table 145. Also, at the option of the user, a local copy (and/or a portion) of the mapping table 145 may be stored in the database 120 on the computer 20 as mapping table 145a, so that the user can continue to update (and automatically fill in forms) the mapping table 145 while working offline, i.e., not connected to the network 30 (e.g., the Internet). When access to the network 30 is again available, the applications 105 and 105a can communicate to synchronize data in the local mapping table and the mapping tables 145. The mapping table 145a stored by the computer 20 may be reduced in scope according to a selection of user preferences. For example, the mapping table 145a may not contain only English (US based) labels but not any foreign labels.

Further, the application 105 is configured to initialize the user profile 130 such as when the user utilizes his user profile 130 for the first time. For example, the application 105 is configured to download the predefined tags 140 for the user profile 130. The application 105 receives an input value by the user to respectively correspond to each of the downloaded predefined tags 140, and the application 105 stores the tag to value (tag 1 to value 1, tag 2 to value 2 . . . tag N to value N) relationships in the user profile 130 of the database 115 as shown in FIG. 2. For example, the user may fill in the training form 150, and once (as) the user fills in the values for the predefined tags 140, the application 130 learns the values and generates the tag to value mapping for the user profile 130. When the application 105 is automatically filling in forms for the user, the application 105 downloads user profile 130, if the corresponding predefined tag 140 is defined in the user profile 130, the application 105 automatically (by recognizing the labels of the forms) fills in the form and/or allows the user to choose value 1, value 2, value 2 (such as the values shown in the box 406 of FIG. 4) to fill in the form. If the value of the corresponding predefined tag 140 is not defined in the user profile 130, the application 105 asks the user to fill in the information for the field. Also, the application 105 then captures the value and stores it in the user profile 130.

In FIG. 2, the mapping table 145 illustrates the mapping of the predefined tags 140 to its corresponding labels (by the application 105). For example, tag 1 is assigned to label A, label B, and label C. Tag 2 is assigned to label D, label, E, and label F. Also, tag 3 is assigned (by the application 105) to the following labels: "family name", "last name", Korean equivalent to last name (represented as "ABC"), and "cognomen". The labels for tag 3 may be identified from other forms (that are different from the training forms 150) when users input values in the different forms, and the application 105 recognizes that the same value has been input as the value stored in the user profile 130 for a particular predefined tag 140. The application 105 searches for a match to the input value in the user profile 130 and locates the corresponding predefined tag 140 in the user profile 130, such as the tag 3 and the application 105 assigns the label in the different form to the tag 3. As such, if the label in the different form was "cognomen", the application 105 scans the different form to find and extract the label "cognomen" because "cognomen" corresponds to the same value (e.g., "Smith" which is assigned to tag 3) in the user profile 130. Now, the label "cognomen" will be mapped (assigned) as an additional label for tag 3 as shown in the mapping table 145. As mentioned herein, this process by the application 105 occurs for each user in the social network who fills out any type of form and automatically (continuously) builds the mapping table 145 without an administrator having to manually input labels for each predefined tag 140.

Figure 4:
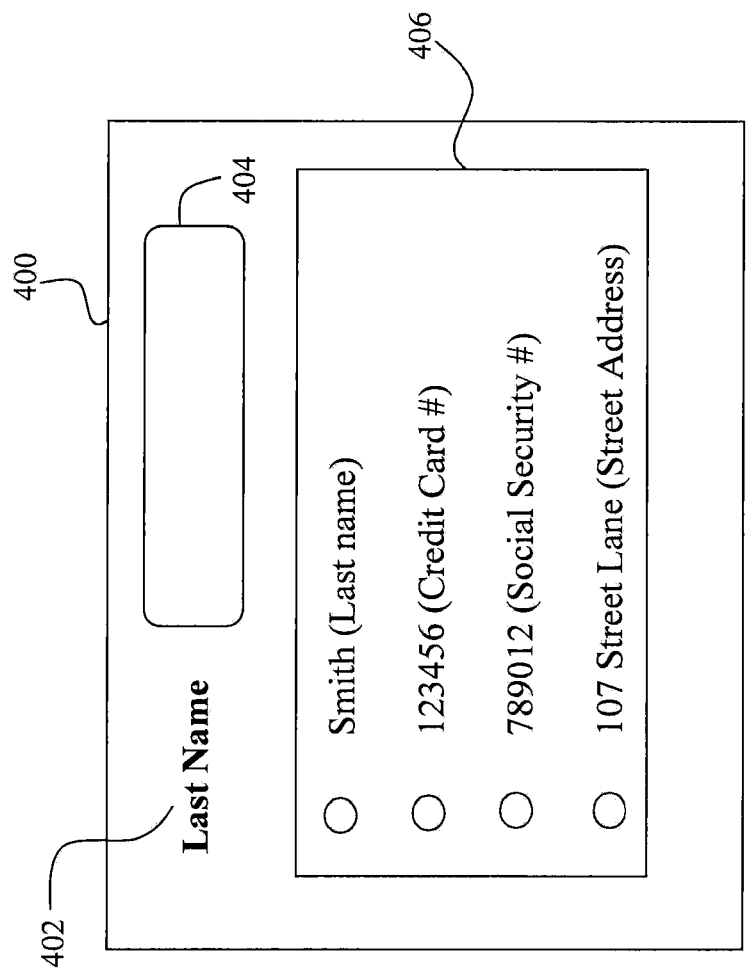
FIG. 4 illustrates a block diagram in accordance with exemplary embodiments.

Now turning to FIG. 4, FIG. 4 illustrates a block diagram of a graphical user interface (GUI) and shows an example of a field 400 in accordance with exemplary embodiments. One skilled in the art understands a GUI. The field 400 may be one of many fields of a form in which the user is filling in, and the form may be any electronic form hosted by (or downloaded from), e.g., various websites 80 on host servers 85. The field 400 is displayed to the user on the display 45. In accordance with exemplary embodiments, the application 105 is configured to fill in the field 400 by scanning and recognizing a label 402 for an empty box 404. The application 105 identifies the label 402 and searches in the mapping table 145 for a match to the label 402 which corresponds to a predefined tag 140. The application 105 may find the match to the label 402 to be the tag 3 (which is one of the predefined tags 140) as shown in the mapping table 145 in FIG. 2. Once the match to the label 402 is found, the application 105 utilizes the tag 3 to search in the user profile 130 to find the corresponding value which is value 3 (of the values 1–N). Accordingly, the application 105 is configured to automatically fill in the empty box 404 with the value 3 (e.g., "Smith").

One issue related to data gathered in a social networking environment is the trustworthiness of the information posted. Most conventional systems require some sort of explicit rating from the users (of the social network) which makes them cumbersome and ineffective.

However, exemplary embodiments provide the application 105 to intelligently quantify the trustworthiness of the training data (collected from users of the social network utilizing computers 20 and 70) in accordance with exemplary embodiments.

By the application 105 analyzing the users' interventions with the forms (which is the form being automatically filled in), rating is done transparently by the application 105, which thus provides greater robustness and efficiency and is less error prone. The application 105 performs form data analysis (such as the entire form to be filled in) and field-level data analysis (individual data fields) in different metrics and granularities. The application 105 is configured to increase system security measures to eliminate ill-intended data tampering by any user of the social network. The application 105 provides a user configurable threshold level to control auto fill-in behavior in the GUI.

For example, when any user has a form that needs to be filled in, the application 105 (e.g., which may be an Internet Explorer® add-on as application 105a for a web page) is configured to track and collect acceptance information 155 as the user fills in the form. The acceptance information 155 is stored in the database 115. The acceptance information 155 is a collection of each time the user (and any user) accepts and rejects (which is the same as changes) the value automatically input by the application 105. The acceptance information 155 also keeps track of which predefined tag 140 corresponds to the pre-filled value in the user profile 130 and which label matched (corresponds to) the predefined tag 140 in the mapping table 145. Accordingly, the application 105 can identify the label recognized in the form and can identify which predefined tag 140 that the recognized label is mapped to; when an error is determined the incorrect label to predefined tag 140 mapping can be removed. In other words, the application 105 can automatically remove the label.

For example, for each form to be automatically filled in, the application 105 is configured to automatically fill in the values and detect whether the value has been altered by the user from the pre-filled value. This allows the indication (to the application 105) of acceptance without user intervention (e.g., without the user explicitly submitting a vote). The application 105 is configured to accumulate the acceptance score (as the acceptance information 155) of the form by looking at the percentage of the pre-filled values being accepted (and rejected) by the user (which may be based on each recognized label in the form and the predefined tag 140 that the recognized label is mapped to). The application 105 uploads the acceptance information to the centralized server 10. As discussed herein, the application 105 includes the application 105a, and the application 105a may be a plug-in to, e.g., Internet Explorer®, Firefox®, and so forth.

Further, the application 105 is configured to allow the user to configure "to fill or not to fill" based on a threshold score (per-form and/or per-field). The threshold score can be set by the user, e.g., at 75%. Accordingly, if a trustworthiness score for a field is not at the threshold score of 75%, the application 105 does not automatically insert the pre-fill value for the field. Also, if the trustworthiness score for the entire form does not reach the threshold score of, e.g., 75%, the application 105 does not fill in the form. The trustworthiness score may be calculated by the application 105 based on the acceptance and rejection of pre-filled values across the users of the social network, and the trustworthiness score is stored in the database 115. For each form, the application 105 is configured to retrieve the trustworthiness score from the database 115 of the centralized server 10. Based on the trustworthiness score and the configured threshold score, the application 105 is configured to determine whether auto fill-in should be performed. There are many options in which the user may configure the auto fill-in for the application 105. For example, the user can configure preferences (of the application 105) for "don't fill in", "fill in", and/or "fill in with confirmation" based on different threshold scores set by the user. The preferences of the application 105 may be configured by the user so that if the trustworthiness score is below threshold X, "don't fill in" the value. The preferences of the application 105 may be configured by the user so that if the trustworthiness score is above threshold X but below Y, "fill in with confirmation". The preferences of the application 105 may be configured by the user so that if the trustworthiness score is above threshold Y "fill in" automatically.

Additionally, the application 105 is configured to calculate the trustworthiness score from the acceptance information 155 collected using a statistical method (such as, e.g., summation) and to distribute the trustworthiness score (for, e.g., a label, predefined tag, etc.) to individual users upon request. The user may request via the GUI (of the application 105a and/or application 105) for the trustworthiness score for a particular field.

The acceptance information 155 is utilized to refer to the acceptance information 155, acceptance information 155a, and acceptance information 155b, and when a distinction is meant between the acceptance information 155, 155a, and 155b, acceptance information 155a or 155b will be indentified individually.

The application 105 is configured with other security measures to prevent data tampering by hackers, such as monitoring (and rejecting based on) user location, repeated voting from the same IP address, etc., when the user is attempting to skew the label to predefined tag 140 mapping in the mapping table 145.

Turning back to FIG. 4, the application 105 may automatically insert a pre-fill value (such as "Smith", "123456", "789012" or "107 Street Lane") from a box 406. For example, the application 105 may automatically insert the value "Smith" in box 404. If the user intervenes to, e.g., erase the value, the application 105 is configured to recognize this user intervention as a rejection and the application 105 adds this user intervention to the acceptance information 155. If the user does not erase (or change the value) the automatically filled value "Smith", the application 105 is configured to recognize this user intervention (which is actually no intervention by the user) as an acceptance, and this user intervention is added to the acceptance information 155. Also, in exemplary embodiments, the application 105 may provide the options in the box 406 from which the user can select. If the user selects, e.g., "Smith", the application 105 is configured to recognize this user intervention (which is the selection of "Smith") as an acceptance which is added to the acceptance information 155. For the user, the application 155 collects both rejections/deletions and acceptances for the acceptance information 155.

Figure 6:
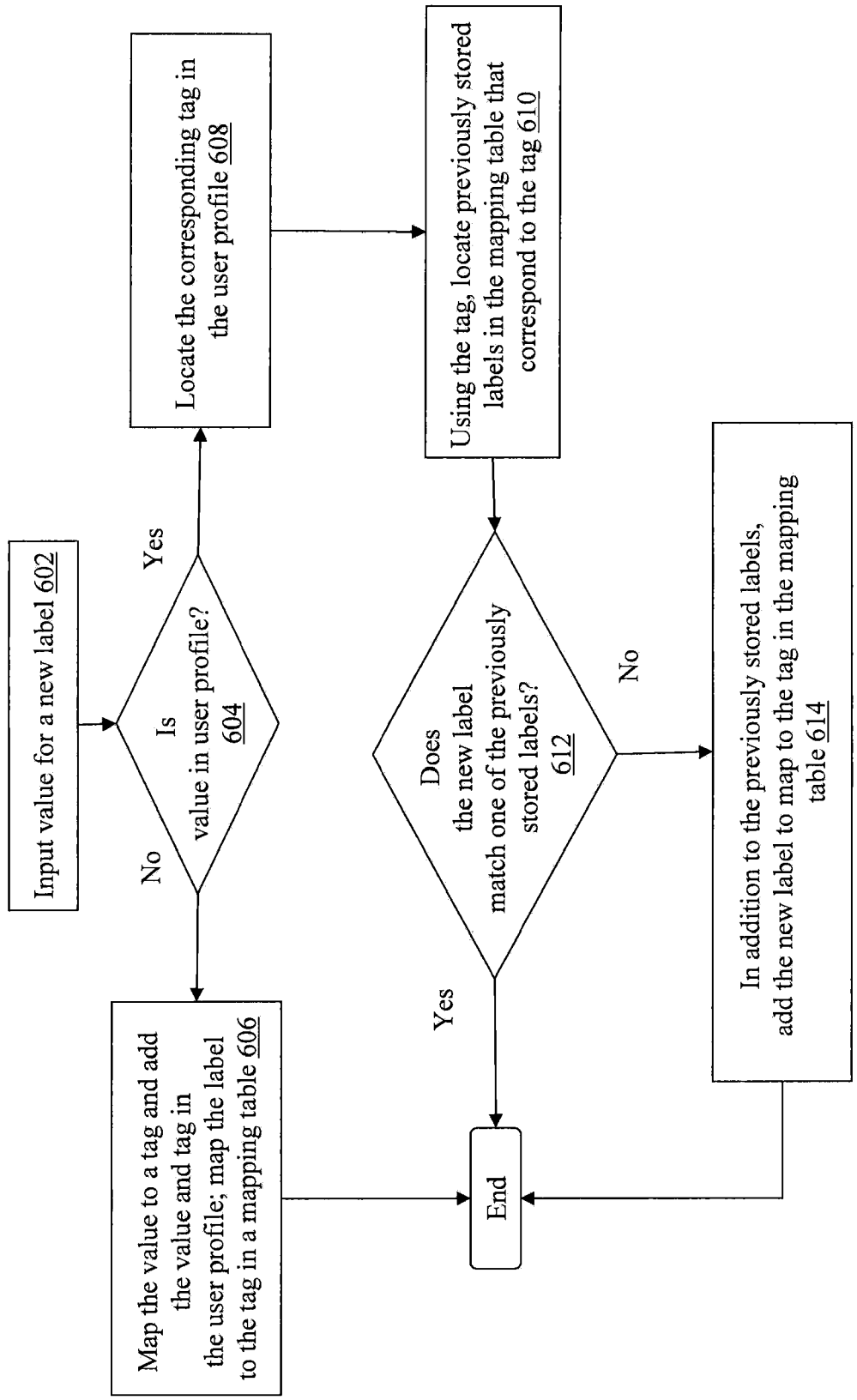
FIG. 6 illustrates a method in accordance with exemplary embodiments.

FIG. 6 illustrates a process 600 for sharing training data in accordance with exemplary embodiments.

The application 105 is configured to receive the input value by a user for a new label of a form at 602.

The application 105 is configured to determine whether the value input by the user is in the user profile 130 at 604.

If the value is not in the user profile 130, the application 105 is configured to map the value to a tag (predefined tag 140) and add the value and tag in the user profile 130, and the application 105 is configured to map the label to the tag in the mapping table at 606. The process ends.

If the value is in the user profile 130, the application 105 is configured to locate the corresponding tag in the user profile at 608.

Using the tag, the application 105 is configured to locate the previously stored labels in the mapping table 145 that correspond to the tag (predefined tag 140) at 610.

The application 105 is configured to determine whether the new label matches one of the previously stored labels at 612.

If the new label does match one of the previously stored labels, the application 105 ends the process. If the new label does not match one of the previously stored labels, the application 105 is configured to add the new label to map to the tag in the mapping table in addition to the previously stored labels at 614.

The process 600 occurs for each user (such as a first user, second user third user, through user N) of the social network to expand and increase the labels corresponding to each one of the predefined tags 140 in the mapping table 145. Since new terms (labels) are constantly being added in society, when the users of the social network fill in a box of a form with values, and values are described by new labels (terms), the application 105 automatically adds the new label to the predefined tag 140 in the mapping table 145. The process 600 keeps the labels of the mapping table 145 up-to-date (by the users of the social network) without having to have an operator manually input labels for each term.

Figure 7:
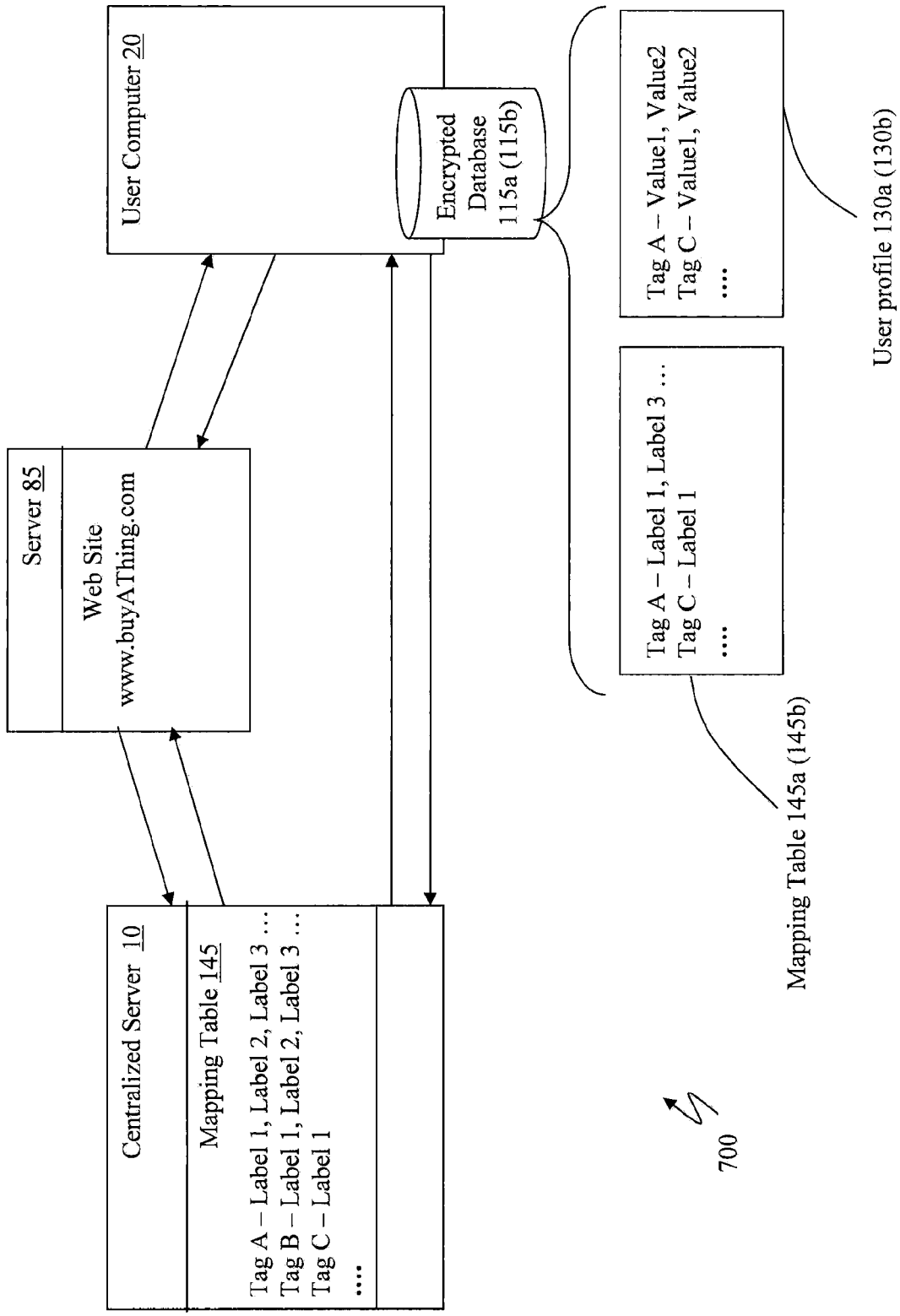
FIG. 7 illustrates a diagram in accordance with exemplary embodiments.

Further regarding initializing the user profile 130, FIG. 7 illustrates an example diagram 700 in accordance with exemplary embodiments and FIG. 7 is an abridged version of FIG. 1. FIG. 7 illustrates the centralized server 10, the host servers 85, and the computer 20. All the elements shown in FIG. 1 are understood but not repeated in FIG. 7 so as not to obscure diagram 700. For example, the network 30 is not repeated along with various software and hardware modules from FIG. 1.

With reference to FIG. 7, different scenarios will be described for utilizing exemplary embodiments to gain a better understanding but are not meant to be limiting. In a first scenario, the user of the computer 20 signs up for an automatic form filling service for the first time in accordance with exemplary embodiments. The user may sign up for the auto form filling service of by registering with user information the application 105 as understood by one skilled in the art. The application 105a (such as a plug-in) is installed in the user computer 20, which works with the web browser on the user computer 20. The application 105a downloads the list of existing predefined tags 140 and their corresponding labels ("Tag-Label") from the centralized server 10 and/or the remote device 21.

The application 105a asks the user to input information for each (displayed) label (which corresponds to the predefined tags 140). For example, if the user is in England, the application 105 may have the relationship "Tag: Lastname, to Label: Family Name"; the user will be asked for her "Family name" on the display screen 45.

In the application 105a, the user may input "Smith" (which is a value) such that the Family Name=Smith. The application 105a will store the "Tag" and "Smith" (i.e., Tag and value) in the database 115a belonging to the user. For example, the application 105a stores the "Tag" and "Smith" (i.e., Tag and value) in the user profile 103 as discussed herein.

The user profile 130 (which may be a database itself) could be local on the computer 20, and/or provided by the remote device 21. For example, the remote device 21 may include a user profile 130b in the database 115b. In the present disclosure, the user profile 130 is utilized to refer to the user profile 130 and user profile 130b unless otherwise specified. Note that each individual user has her own user profile 130 containing personal data utilized for automatically filling in forms. In addition to the mapping table 145 having the predefined tag 140 to label relationship, the user may choose to store a whole and/or partial mapping table 145b locally (such as the relationship of Tag A to Label 1, Label 3 . . . ). The application 105 provides the user with user preference options for what and the amount of information to store in the mapping table 145. For example, the user preference options for the mapping table 145b may be based on and/or the application 105 may automatically restrict labels in the mapping table 145b based on the implementation, configuration (language, locale), available database storage, etc. For example, if the user selects and/or the application 105 automatically limits the labels in the mapping table 145b to English. Accordingly, since the user listed English only (e.g., during registration), the mapping table 145 would not include a label as a Korean equivalent to the English label "LastName" or a label as a Malaysian equivalent to the English label.

In a scenario example, the user is now registered for the automatic form filling service and is attempting to fill in a form. In this scenario, the user may or may not have configured (initialized the user profile 130) the automatic form filling service.

The user may access a web site (such as www.buyAThing.com hosted on the server 85) through the URL on the user computer 20, and the user is ready for check out. The web site sends a form (e.g., a check out form) to the user computer 20. The application 105a (plug-in) on the user computer 20 is configured to analyze the form and find a set of labels on the form.

For each label (e.g., "Last name"), the application 105a queries the mapping table 145a on the database 115a for the label and in an attempt to find a predefined tag 140 that corresponds to the label.

If local mapping table 145a in the local database 115a did not show any matches for the label, the application 105a will query the centralized server 10 to search for the label in the mapping table 145.

Now, by using label in the query, the application 105 has found the corresponding predefined tag 140 (from mapping table 115 in database 115 of centralized server 10 or the local mapping table 145a in the user database 115a). The application 105a queries the user profile 130 (with the corresponding tag) to find the tag and value. If the tag exists and a value is defined for the tag in the user profile 130, the application 105a fills in the value in the form downloaded from the web site.

On the other hand, if the tag exists and a value is not defined, the application 105 displays a dialog box to the user with a user friendly label (e.g., a label of "Family Name" could be displayed), and the user inputs the value. The application 105a adds the "Value" for the tag to the user profile 130 to correspond with the tag.

If the tag does not exist in the user's list of predefined tags 140a but was found in the predefined tags 140 in the centralized server 10, the application 105a displays a dialog box to the user with a user friendly label. The application 105a receives the value input by the user and adds the "Tag and Value" to the user profile 130. The "new" predefined tag 140 may not be in the user's predefined tags 140a because a member of the social network may have input the "new" tag. For example, the user may have a form with a label in Korean and the application 105 finds a tag to match the Korean label. Instead of displaying the Korean label to the (US) user, the application 105 displays a US label such as "Family name" as shown in FIG. 2 for Tag 3.

In a third scenario, the user helps the centralized server learn about more labels in accordance with exemplary embodiments. As mentioned above, the user may access the web site www.buyAThing.com and is ready for check out. The web site on server 85 send a form (checkout form) to the user computer 20, and the application 105a (plug-in) analyzes the form to find a set of labels. For each label (e.g., such as ZZZMoBa), the application 105a queries the mapping table 145a for the label hoping to find a tag (that corresponds to the label ZZZMoBa). If the local mapping table 145a did not show any match for the label, the application 105a will query the mapping table 145 on centralized server 10. Unlike the second example above, the application 105a did not find a matching tag (that corresponds to the label ZZZMoBa) in the mapping table 145 of the centralized server 10 or the mapping table 145a of the user computer 20. Accordingly, the application 105a executes the following process. The application 105a asks the user to input a value with (displaying) the label given by the form (i.e., ZZZMoBa). The application 105a receives the user input a value "Smith". The application 105a queries the user profile 130 for a value "Smith", and finds that "Smith" belongs to a Tag "Last name" (such as Tag 3 in FIG. 2). The application 105a sends the label "ZZZMoBa" to the centralized server 10 indicating that it (ZZZMoBa) maps to Tag "LastName" (which is Tag 3 in FIG. 2), and the application 105 adds "ZZZMoBa" to the mapping table 145 to correspond with Tag "LastName" (e.g., Tag 3). Optionally, the application 105a may update/add to the "ZZZMoBa" to the Tag-Label relationship in the local mapping table 145a.

In a fourth scenario, the user helps the centralized server to learn about more labels in accordance with exemplary embodiments. As mentioned above, the user access the web site www.buyAThing.com and is ready for check out. The server 85 of the web site sends a form (checkout form) to the user computer 20. The application 105a recognizes and analyzes the form, and the application 105a finds a set of labels on in the form. For each label (e.g., ZZZMoBa), the application 105a queries the local mapping table 145a attempting to find a tag (that corresponds to the label in the query). If local mapping table 145 did not show any match for the label "ZZZMoBa", the application 105a will query the mapping table 145 of the centralized server 10. In this fourth scenario, the application 105a did not find a matching tag in the mapping table 145 of the centralized server 10 or in the local mapping table 145a of the computer 20.

Now, the application 105a asks the user to input a value with the label (ZZZMoBa) given by the form. The application 105a receives a user input value "Smith". The application 105a queries the user profile 130 for a value "Smith", and did not find any matches to the value. The application 105a is configured to send "ZZZMoBa" to the centralized server 10 indicating that there is a new tag and new label. The application 105 creates a new tag (e.g., a string) to correspond with the new label "ZZZMoBa". Also, the application 105 creates the new tag as "ZZZMoBa" and create the new label as "ZZZMoBa". Either way the new tag and new label are both stored in the mapping table 145 on the centralized server 10. Optionally, the application 105a updates/adds the new tag and new label (Tag-Label) relationship in the local mapping table 145a.

Figure 8:
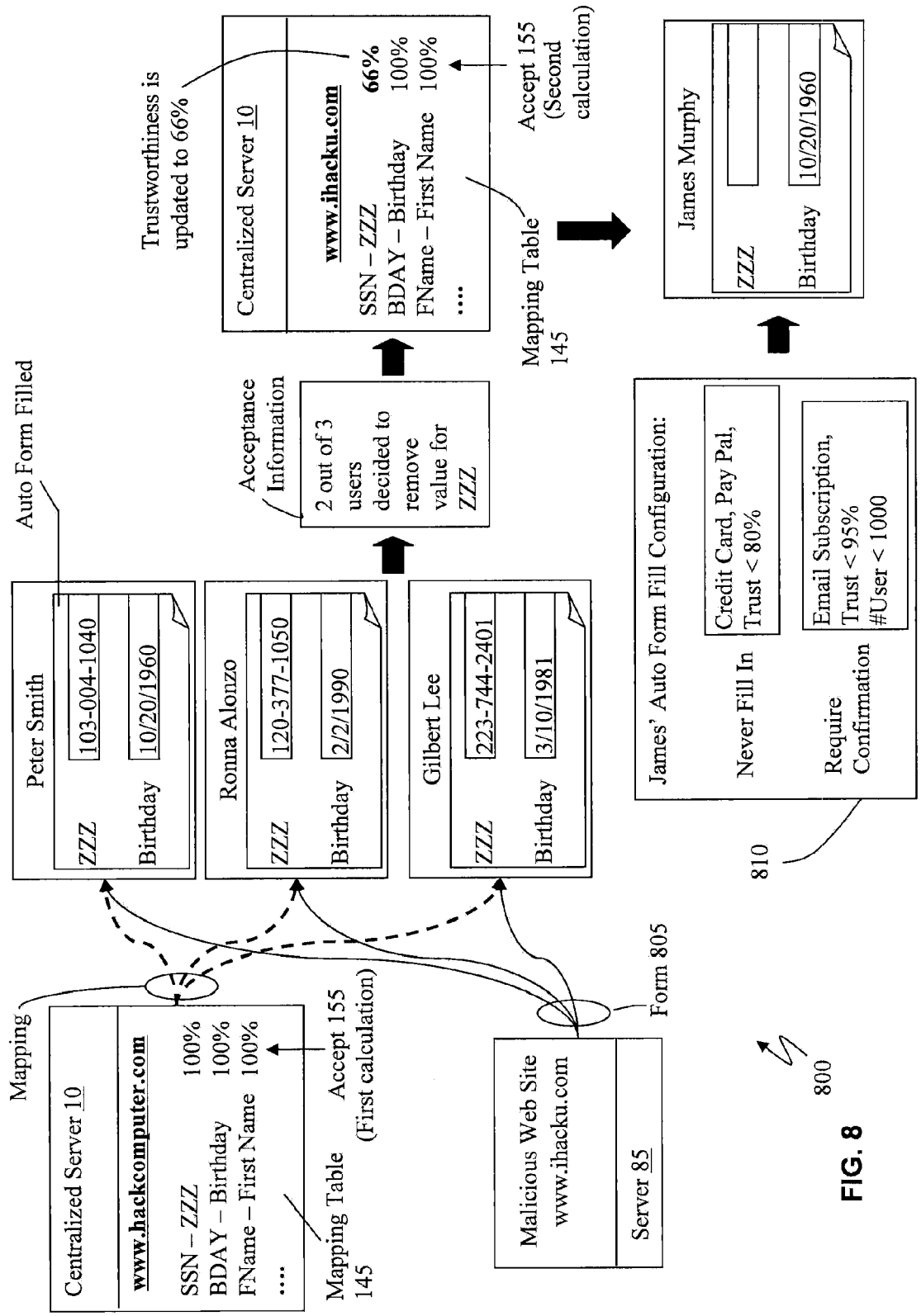
FIG. 8 illustrates a diagram in accordance with exemplary embodiments.

Now turning to FIG. 8 illustrates an example diagram 800 in accordance with exemplary embodiments and FIG. 8 is an abridged version of FIG. 1. All the elements shown in FIG. 1 are understood but not repeated in FIG. 8 so as not to obscure diagram 800. For example, various software and hardware components may not be repeated from FIG. 1.

The diagram 800 illustrates an example in which a malicious website site on server 85 attempts to cause predefined tags 140 to be incorrectly mapped to improper labels in the mapping table 145, with the hopes that when the application 105 auto fills in a form, personal information may be filled in the form in unrelated fields without the user recognizing the mistake.

For example, hackers of the malicious web site (represented as www.hackcomputer.com) may have signed up for the social network. The malicious web site on the server 85 may communicate with the server 10 to pre-associate labels ("ZZZ" and Birthday) with the predefined tags 140, so that auto fill in will be quicker. However, as seen in the mapping table 145, the malicious web site on server 85 has improperly associated the "ZZZ" label with the predefined tag 140 for social security number. "ZZZ" could be an address label, telephone number label, and/or any other label that does not display social security number to the user. The hackers may fill in the hacker form 805 and request the application 105 to automatically retrieve the corresponding information from the user profile 130. So for example, the application 105 will recognize that predefined tags 140 have been pre-associated with labels in the hacker form 805 so the application 105 will utilize the pre-associated tags 140 to extract the corresponding values from the user profile 130. The application 105 will fill in the hacker form 805 will a social security number for the label "ZZZ". Alternatively, and/or additionally, the hackers may not have pre-associated predefined tags 140 to labels of the hacker form 805 but hackers may input their corresponding social security number (which will probably be false) for the "ZZZ" label so that the application 105 will recognize (and map) the "ZZZ" label to the predefined tag 140 for social security number in the mapping table 145. By to the example, there may be three hackers of the malicious web site that fill in the hacker form 805 and accept the auto fill in values of the application 105, such that the accept 155 calculates a 100% trustworthiness score for these associations.

There may be three users (who are members of the social network) who access (e.g., download) the hacker form 805 on their respective computer 20. Peter may recognize that for the "ZZZ" label his social security number (value) was automatically filled in from the user profile 130, and Peter deletes this value and input the correct value (which may be telephone number). Likewise, Ronna recognizes that her social security number was automatically filled in by the application 105; she deletes this value and inputs the correct value (e.g., telephone number). However, Gilbert may not recognize this error. The accept 155 retrieves and/or is pushed this acceptance information from the three users, and the accept 155 modifies the trustworthiness for these associations based on the responses to the automatic fill in by the application 105. Since two of the three user's rejected the value input for the mapping association between tag 140 social security number and label "ZZZ", accept 105 calculates the new trustworthiness score as 66%. For each user who accepts and rejects the value input for the "ZZZ" label, the accept 155 will continue to calculate a new trustworthiness score to reflect the malicious intentions of the malicious web site on the server 85.

Also, as additional security features, another member of the social network (James) may set auto form fill in configurations (i.e., preferences) 810 in his user profile 130. For James, the application 105 may never auto fill in values (from the user profile 130) for credit card information, social security number, pay pal information, and/or any financial type information if the trustworthiness is less than 80%. Accordingly, since the trustworthiness is currently 66%, the application 105 is not permitted to fill in the value for James' social security number into the field for the "ZZZ" label. For example, the application 105 may use to the tag 140 to locate the corresponding value for the social security number for James but recognizes that the value requires a greater than 80% trustworthiness. The application 105 will check the trustworthiness for this association, determine that the trustworthiness is 66%, and not automatically fill in the value for the "ZZZ" label.

Also, the configurations (preferences) 810 for James may require confirmation before the application 105 automatically inputs certain values from the user profile 130. For example, confirmation may be required before the application 150 automatically fills in an email address for email subscriptions, when the trustworthiness is less than 90%, when the number of members who have used a particular form is less than 1000, and so forth.

Further regarding security features, the logical algorithm that is implemented by the accept 155 can utilize many metrics to determine trustworthiness. For example, the algorithm of the accept application 155 could be based on a percentage, ratio (of acceptances, deletions, and/or replacements), weight average, and/or any other statistical method. For calculating the trustworthiness incorporating weight average, the accept 155 could add more weight to a deletion than a replacement.

Also, for calculating the trustworthiness score for a tag to label association, the input into the algorithm of the accept 155 may include acceptance count, replacement count, deletion count, and/or any detectable and accountable value; each input into the accept 155 could be weighted. Further, the calculation for the trustworthiness can be weighted based on the number of unique users (members) involved in the pool for this association. For example, members who are all utilizing the same IP address (or group of IP addresses), server, MAC address, user ID/password, friends network, etc., would be given less weight in determining the trustworthiness score for the association.

The trustworthiness calculated by the accept 155 will also change when a web site is purchased by another person (entity), when a web site is being hacked, and/or based on "age" of the captured acceptance information. With respect to "aging", the older acceptance information may have less weight (and/or more weight) depending on the algorithm of the accept 155. For example, acceptance information from the last 2 days may have more weight in the trustworthiness calculation by the accept 155 than last month's (year's) acceptance information.

Additionally, the calculation of the trustworthiness (by the accept 155) may be based on the total number of users who filled in a form from the particular web site. If there are fewer users then there is a lower trustworthiness, there may have to be a certain number of user before the trustworthiness is able to reach a certain score (like 80%), etc.

As discussed herein, the trustworthiness score (of the accept 155) could be per field on the form and/or an overall form level trustworthiness for the entire form. The application 105 may be implemented as, e.g., a plug-in that could allow users to explicitly report malicious/suspicious activities and other metrics could be determined implicitly through user behavior.

The logic of the accept 155 is configured to allow the user to make mistakes and allow the algorithm to make mistakes. The social network and aging built into the accept 155 will correct the mistake automatically. When the application 105 automatically inputs value to a form, a user may be inebriated (or inattentive) when filling in the form and the user may mistakenly delete correct values, accept incorrect values, and/or replace correct values with incorrect values. The accept 155 would receive this acceptance information of the inebriated user to calculate the corresponding trustworthiness. However, since the trustworthiness of the accept 155 is calculated based on the acceptance information of numerous users of the social network, the actions of the inebriated user can be corrected by the accept 155 because a single user can not skew the average. Further, as the acceptance information for the inebriated user "ages", his information will have less weight (compared to 900 other users) in the trustworthiness calculation by the accept 155. As such, the mistake and/or malicious act of a user becomes insignificant as compared to the other users of the social network, and thus the accept 155 is self-correcting.

The security features may further be integrated in with Google Alert™, SafeSearch™, etc.

With regard to malicious web site testing application, malicious web site testing application uses content inspection, which does not handle "new Attack Mechanism". Security features of exemplary embodiments will allow malicious web site problems to be discovered faster, e.g., before the content inspection application has a chance to react to the threat. Exemplary embodiments will prevent the problem from spreading (create a score), once the accept 155 has a chance to gain enough feedback (a predefined number) from the social network. Further, after seeing malicious behavior with respect a web site, the user may explicitly click on a button (of a GUI of the application 105) to indicate "disliked" or "unsafe" website.

As discussed herein, the application 105 may be a plug-in that assists (listens) to user activities via, e.g., Internet Explorer® browser. Since exemplary embodiments relate to receiving feedback from users (members) in a social network, when in a peer-to-peer (P2P) download environment such as Edonkey, which may be generally used to share video files, music files, and computer programs, the application 105 may monitor user actions to benefit the members of the social network. When the user conducts a file search for a file sharing web site (such as Edonkey), for the same file search result (e.g., user was looking for a single file), the user (click on to) downloads the first file, and if the user downloads a second file, the application 105 will accept this is a good indicator that the first file "might not work for the user". By application 105 monitoring the user actions (which include the user's search, the search results, and the subsequent selections of links in the search results), the application 105 recognizes that the download link to the first file is possibly bad and creates a score; the value (which may be a low value) of this score reflects to the members that the first file link is possible bad (i.e., less trustworthy), since the second file link was selected for the same search results of the peer-to-peer environment.

Also, while being monitored by the application 105, suppose a browsing user clicks on a link (web site) and after accessing the link, the link causes the computer 20 to open an additional five browser windows. The application 105 will create a score for this link, and the value (which may be a low value) of the score (reflects to the members) that multiple web browser widows popped of from this link.

Figure 5:
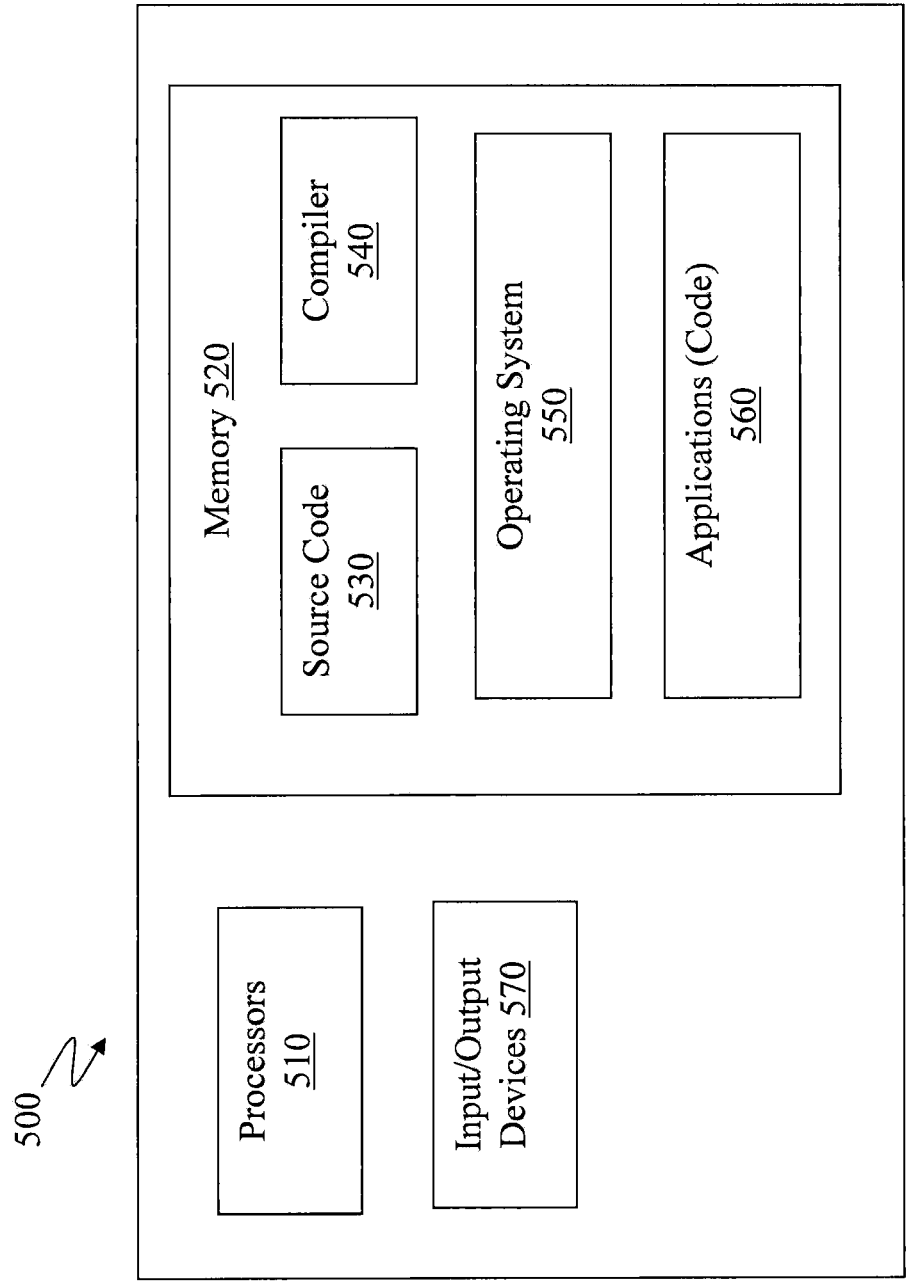
FIG. 5 illustrates an example of a computer having capabilities, which may be included in exemplary embodiments.

FIG. 5 illustrates an example of a computer 500 having capabilities, which may be included in exemplary embodiments. Various methods, procedures, modules, flow diagrams, and techniques discussed herein may also incorporate and/or utilize the capabilities of the computer 500. Moreover, capabilities of the computer 500 may be utilized to implement features exemplary embodiments discussed herein. One or more of the capabilities of the computer 500 may implement any element discussed herein, e.g., such as but not limited to elements 105, 105a, 105b, 115, 115a, 115b, 10, 20, 21, 70, 130 etc.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 160 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application(s) 560 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 520 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method implemented on a computer for sharing form data by users of a social network, comprising:
   receiving at the computer a first value that is input for a first label on a form by a first user;
   associating by the computer the first label with a tag in a mapping table;
   associating by the computer the first value with the tag in a first user table;
   receiving at the computer the first value that is input for a different label on a different form by the first user;
   recognizing by the computer that the first value is input for the different label on the different form than the first label by the first user;
   in response to recognizing by the computer that the first value is input on the different form for the different label than the first label, associating by the computer the different label with the tag in addition to the first label in the mapping table;
   each time the first user inputs the first value on other forms having other labels different from the first label and the different label, associating by the computer each of the other labels to the tag in the mapping table in addition to the first label and the different label in order to build labels for the mapping table without requiring an administrator to manually input the labels for the tag;
   in response to a social network user inputting data into a form designed to cause a predefined tag for a predefined value to be mapped to an incorrect label thereby forming a false association, automatically inputting by the computer the predefined value for the predefined tag into a field for the incorrect label in the form based on the false association;
   wherein the false association is defined to cause the predefined value to become viewable in the field for the incorrect label in the form, when other users have data automatically filled into the form;
   when the other users have data automatically filled in, determining by the computer the false association of the predefined tag for the predefined value mapped to the incorrect label based on a trustworthiness score for the false association being less than a required score for the predefined tag.

2. The method of claim 1, further comprising:
   receiving at the computer a second value that is input for a second label by a second user;
   associating by the computer the second label with the tag in the mapping table;
   associating by the computer the second value with the tag in a second user table;
   recognizing by the computer that the second value is input for a different label than the second label by the second user; and
   in response to recognizing that the second value is input for the different label than the second label, associating by the computer the different label than the second label with the tag in the mapping table.

3. The method of claim 2, wherein when a third user has a third value associated with the tag in a third user table, and when the third user inputs the third value for a third label, the computer is configured to associate the third label with the tag in the mapping table;
   wherein the first user, second user, and third user are part of the social network; and
   wherein an amount of associations in the mapping table is configured to increase based on input by the first user, second user, third user, and other users of the social network.

4. The method of claim 1, wherein for the first value being associated with the tag in the first user table, when the first user inputs the first value for any other label, the computer is configured to associate the other label with the tag in the mapping table.

5. The method of claim 1, further comprising initializing the first user table by the first user inputting a plurality of values to be associated with a plurality of tags respectively for storing in the first user table;
   wherein the first value is one of the plurality of values and the tag is one of the plurality of tags.

6. The method of claim 5, wherein each time the first user inputs the first value in a form, the computer is configured to check the first user table to determine whether the first value is associated with one of the plurality of tags;
   wherein when the tag is found as one of the plurality of tags that is associated with the first value, the computer extracts a corresponding label from the form in which the first value is input; and
   wherein the computer associates the corresponding label with the tag in the mapping table to cause an increase in an amount of labels associated with the tag in the mapping table.

7. The method of claim 1, further comprising determining the trustworthiness score;
   wherein when the computer automatically inserts pre-fill values in fields of a form, the trustworthiness score is determined based on user intervention to accept or reject the pre-fill values.

8. The method of claim 7, wherein when user intervention rejects the pre-fill values, labels associated with the pre-fill values receive a lower trustworthiness score.

9. The method of claim 7, wherein when user intervention accepts the pre-fill values by not changing the pre-fill values automatically inserted in the fields, labels associated with the pre-fill values receive a higher trustworthiness score.

10. The method of claim 1, wherein each time any of the users of the social network respectively inputs a same value for different labels of different forms and when the same value is associated with the tag in respective user tables of the any of the users, the computer is configured to associate the different labels with the tag in the mapping table to expand the mapping table.

11. The method of claim 1, wherein the mapping table is shared across users of the social network; and
wherein user tables are not shared across the social network.

12. The method of claim 1, further comprising receiving at the computer the first value that is input for a foreign label by the first user in a first document; and
associating by the computer the foreign label with the tag in the mapping table.

13. The method of claim 12, wherein when the computer parses a second document and locates the foreign label, the computer searches for the foreign label in the mapping table and finds the tag that corresponds to the foreign label in the mapping table;
wherein if a second user is filling in the second document, the computer utilizes the tag to locate a second value that corresponds to the tag in a user table for the second user; and
wherein the computer automatically inserts the second value as input to a field for the foreign label in the second document.

14. A computing device configured for sharing form data of users of a social network, comprising:
memory for storing a program; and
a processor, functionally coupled to the memory, the processor being responsive to computer-executable instructions contained in the program and operative for:
receiving a first value that is input for a first label on a form by a first user;
associating the first label with a tag in a mapping table;
associating the first value with the tag in a first user table;
receiving at the computer the first value that is input for a different label on a different form by the first user;
recognizing that the first value is input for the different label on the different form than the first label by the first user;
in response to recognizing by the computer that the first value is input on the different form for the different label than the first label, associating the different label with the tag in addition to the first label in the mapping table;
each time the first user inputs the first value on other forms having other labels different from the first label and the different label, associating by the computer each of the other labels to the tag in the mapping table in addition to the first label and the different label in order to build labels for the mapping table without requiring an administrator to manually input the labels for the tag;
in response to a social network user inputting data into a form designed to cause a predefined tag for a predefined value to be mapped to an incorrect label thereby forming a false association, automatically inputting by the computer the predefined value for the predefined tag into a field for the incorrect label in the form based on the false association;
wherein the false association is defined to cause the predefined value to become viewable in the field for the incorrect label in the form, when other users have data automatically filled into the form;
when the other users have data automatically filled in, determining by the computer the false association of the predefined tag for the predefined value mapped to the incorrect label based on a trustworthiness score for the false association being less than a required score for the predefined tag.

15. The device of claim 14, wherein the processor is further responsive to computer-executable instructions contained in the program and operative for:
receiving a second value that is input for a second label by a second user;
associating the second label with the tag in the mapping table;
associating the second value with the tag in a second user table;
recognizing that the second value is input for a different label than the second label by the second user; and
in response to recognizing that the second value is input for the different label than the second label, associating the different label than the second label with the tag in the mapping table.

16. The device of claim 15, wherein when a third user has a third value associated with the tag in a third user table, and when the third user inputs the third value for a third label, the program is configured to associate the third label with the tag in the mapping table;
wherein the first user, second user, and third user are part of the social network; and
wherein an amount of associations in the mapping table is configured to increase based on input by the first user, second user, third user, and other users of the social network.

* * * * *